(12) United States Patent
Mohri

(10) Patent No.: US 7,716,041 B2
(45) Date of Patent: *May 11, 2010

(54) SYSTEMS AND METHODS FOR REGULARLY APPROXIMATING CONTEXT-FREE GRAMMARS THROUGH TRANSFORMATION

(75) Inventor: Mehryar Mohri, New York, NY (US)

(73) Assignee: AT&T Intellectual Property II, L.P., New York, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 11/857,128

(22) Filed: Sep. 18, 2007

(65) Prior Publication Data

US 2008/0010059 A1    Jan. 10, 2008

Related U.S. Application Data

(63) Continuation of application No. 10/199,227, filed on Jul. 22, 2002, now Pat. No. 7,289,948.

(60) Provisional application No. 60/344,792, filed on Jan. 7, 2002.

(51) Int. Cl.
*G06F 17/27* (2006.01)

(52) U.S. Cl. .................. 704/9; 704/1; 704/2; 704/5; 704/243; 704/255

(58) Field of Classification Search .................. 704/9, 704/1, 2, 5, 243, 255
See application file for complete search history.

(56) References Cited

U.S. PATENT DOCUMENTS

| 5,086,472 A * | 2/1992 | Yoshida ................. 704/255 |
| 5,625,554 A | 4/1997 | Cutting et al. |
| 5,649,215 A | 7/1997 | Itoh |
| 5,719,997 A | 2/1998 | Brown et al. |
| 5,721,939 A | 2/1998 | Kaplan |
| 6,032,111 A | 2/2000 | Mohri |
| 6,243,679 B1 | 6/2001 | Mohri et al. |
| 6,587,844 B1 | 7/2003 | Mohri |
| 6,944,588 B2 | 9/2005 | Kempe |
| 2003/0009331 A1 | 1/2003 | Schalkwyk et al. |

(Continued)

OTHER PUBLICATIONS

Mohri et al., "wighted grammar tools: the GRM library", Robustness in Language and Speech Technology, Kluwer Academic Publishers, 2000, pp. 19-40.*

(Continued)

*Primary Examiner*—Qi Han

(57) ABSTRACT

Context-free grammars generally comprise a large number of rules, where each rule defines how a string of symbols is generated from a different series of symbols. While techniques for creating finite-state automata from the rules of context-free grammars exist, these techniques require an input grammar to be strongly regular. Systems and methods that convert the rules of a context-free grammar into a strongly regular grammar include transforming each input rule into a set of output rules that approximate the input rule. The output rules are all right- or left-linear and are strongly regular. In various exemplary embodiments, the output rules are output in a specific format that specifies, for each rule, the left-hand non-terminal symbol, a single right-hand non-terminal symbol, and zero, one or more terminal symbols. If the input context-free grammar rule is weighted, the weight of that rule is distributed and assigned to the output rules.

19 Claims, 5 Drawing Sheets

U.S. PATENT DOCUMENTS

| | | |
|---|---|---|
| 2003/0074184 A1 | 4/2003 | Hayosh et al. |
| 2003/0120480 A1 | 6/2003 | Mohri et al. |
| 2004/0176945 A1 | 9/2004 | Inagaki et al. |

OTHER PUBLICATIONS

Mohri et al. "Dynamic Compilation of Weighted Context-Free Grammars," Proceedings of ACL '98, Montreal, Quebec, Canada, pp. 891-897.

Cortes et al., "Context-Free Recognition with Weighted Automata," Jan. 2000, Kluwer Academic Publishers, vol. 3, No. 2-3, pp. 133-150.

Roche, Emmanual, Factorization of Finite-State Transducers, Mitsubishi Electrical Research Laboratories, TR-95-2, Version 1.0, Feb. 1995, pp. 113.

Roche et al., Introduction, Finite-State Language Processing, MIT Press, Cambridge, MA, USA, pp. 1-66, Jun. 1997.

Karttunen, Lauri, "Finite-State Lexicon Compiler", Xerox Palo Alto Research Center, Apr. 1993.

Knight et al., "A Primer on Finite-State Software for Natural Language Processing," Aug. 1999, ten pages.

Mohri, M et al., "Weighted finite-state transducers in speech recognition," Computer Speech and Language, Jan. 2002, pp. 69-88, vol. 16, No. 1, XP004418697, Elsevier, London, GB.

Mohri et al. "Regular approximation of context-free grammars through transformation," Robustness in Language and Speech Technology, Kluwer Academic Press, The Netherlands, 2000, pp. 251-261.

Nederhof, M. "Context-free parsing through regular approximation," Proceedings of the International Workshop on Finite State Methods in Natural Language Processing, Ankara, Turkey, 1998, pp. 13-24.

Nederhof, M. "Regular approximations of CFLs: A grammatical view," Proceedings of the International Workshop on Parsing Technologies, Massachusetts Institute of Technology, 1997, pp. 159-170.

Nederhof, M. "Practical experiments with regular approximation of context-free languages," Association for Computational Linguistics, vol. 26, No. 1, 2000.

* cited by examiner

FIG. 1

GRAMMAR RULE R $A \rightarrow a_0 B_1 a_1 B_2 a_2 \ldots \ldots \ldots \ldots B_m a_m$   cost: x

FIG. 2

SET OF STRONGLY REGULAR GRAMMAR RULES $R_S$ $R_{S0}$:   $A \rightarrow a_0 B_1$   cost: $x_0$ $R_{S1'}$:   $B_1' \rightarrow a_1 B_2$   cost: $x_1$ $R_{S2'}$:   $B_2' \rightarrow a_2 B_3$   cost: $x_2$ $\ldots \ldots \ldots \ldots \ldots$ $R_{SM-1'}$:   $B_{m-1}' \rightarrow a_{m-1} B_m$   cost: $x_{m-1}$ $R_{SM'}$:   $B_m' \rightarrow a_m A'$   cost: $x_m$ $R_{SM+1'}$:   $A' \rightarrow \varepsilon$   cost: $\underline{1}$

FIG. 3

GRAMMAR RULE R'

$T \rightarrow aXbcYZd$   cost: 4

FIG. 4

SET OF STRONGLY REGULAR GRAMMAR RULES $R_S'$ $R_{S0}'$:   $T \rightarrow aX$   cost: 1

$R_{S1}'$:   $X' \rightarrow bcY$   cost: 1

$R_{S2}'$:   $Y' \rightarrow Z$   cost: 1

$R_{S3}'$:   $Z' \rightarrow dT'$   cost: 1

$R_{S4}'$:   $T' \rightarrow \varepsilon$   cost: 0

SYSTEMS AND METHODS FOR REGULARLY APPROXIMATING CONTEXT-FREE GRAMMARS THROUGH TRANSFORMATION

The present application is a continuation of U.S. patent application Ser. No. 10/199,227, filed Jul. 22, 2002, which claims the benefit of U.S. Provisional Application No. 60/344,792, filed Jan. 7, 2002, which are incorporated herein by reference in their entirety. The present application is related to U.S. patent application Ser. No. 10/199,220, filed Jul. 22, 2002, now U.S. Pat. No. 7,181,386 and U.S. patent application Ser. No. 11/566,945, filed Dec. 5, 2006, the contents of which are incorporated herein by reference in their entirety.

BACKGROUND OF THE INVENTION

1. Field of Invention

This invention is directed to systems and methods for transforming any context-free grammar into a strongly regular grammar.

2. Description of Related Art

Context-free grammars are used in a variety of technical fields, such as linguistics, speech recognition, speech synthesis (text-to-speech), to represent the conversion of one set of symbols into another set of symbols. For example, context-free grammars can be used to convert acoustic signals into recognized speech.

Grammars generally comprise a large number of rules, where each rule defines how a given string of symbols can be produced from a different series of symbols. In many computer implementations, such grammars are represented or implemented using finite-state automata. If the grammar is a weighted grammar, the weighted grammar is represented as a weighted finite-state automaton. Representing grammars using finite-state automata or transducers is often crucial, as finite-state automata or transducers can be optimized by compacting, determinizing and/or minimizing the finite-state automata or transducers.

SUMMARY OF THE INVENTION

However, generating a finite-state automaton or transducer from a given context-free grammar is not necessarily a trivial exercise, especially given the large number of grammar rules necessary to implement a speech recognition system or a speech synthesis system. While generalized techniques for creating a finite-state automaton or transducer from the rules of a context-free grammar exist, these techniques require an input grammar to be strongly regular. No such generalized techniques exist for creating a finite-state automaton or transducer from the rules of a context-free grammar that is not strongly regular.

This invention provides systems and methods for generating a strongly regular context-free grammar that approximates an input context-free grammar that is not regular.

This invention separately provides systems and methods that generate, from any general linear or non-linear grammar rule, a set of right-linear rules that approximate that rule.

This invention separately provides systems and methods that distribute cost or weight of the input rule to a set of corresponding approximated rules.

In various exemplary embodiments, the systems and methods according to this invention input the rules of a context-free grammar. In various exemplary embodiments, the rules are input using a specific format that specifies, for each rule, the left-hand non-terminal symbol, zero, one or more right-hand non-terminal symbols and zero, one or more terminal symbols. If the context-free grammar is weighted, the format also specifies the weight of that rule. Each input rule is then transformed into a set of output rules that approximate the input rule. In various exemplary embodiments, the output rules are all right-linear and are strongly regular. In various exemplary embodiments, the output rules are output in a specific format that specifies, for each rule, the left-hand non-terminal symbol, a single right-hand non-terminal symbol, and zero, one or more terminal symbols. If the input context-free grammar rule is weighted, the weight of that rule is distributed and assigned to the output rules.

In various other exemplary embodiments, input rules which are already right-linear are included in the output set of rules without transformation. This saves processing time, while the resulting grammar remains strongly regular.

In various other exemplary embodiments, the strongly connected components of the input context-free grammar are identified. The input grammar rules belonging to any strongly connected component that is itself strongly regular are included in the output set of rules without transformation. This saves processing time, while the resulting grammar remains strongly regular.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein:

FIG. 1 illustrates one exemplary embodiment of a generalized context-free grammar rule;

FIG. 2 illustrates one exemplary embodiment of a generalized set of strongly regular grammar rules transformed from and approximating the generalized context-free grammar rule shown in FIG. 1 according to this invention;

FIG. 3 illustrates one exemplary embodiment of a context-free grammar rule R;

FIG. 4 illustrates one exemplary embodiment of a set of strongly regular grammar rules transformed from and approximating the context-free grammar rule R shown in FIG. 3 according to this invention;

DETAILED DESCRIPTION OF EXEMPLARY EMBODIMENTS

Figure 5:
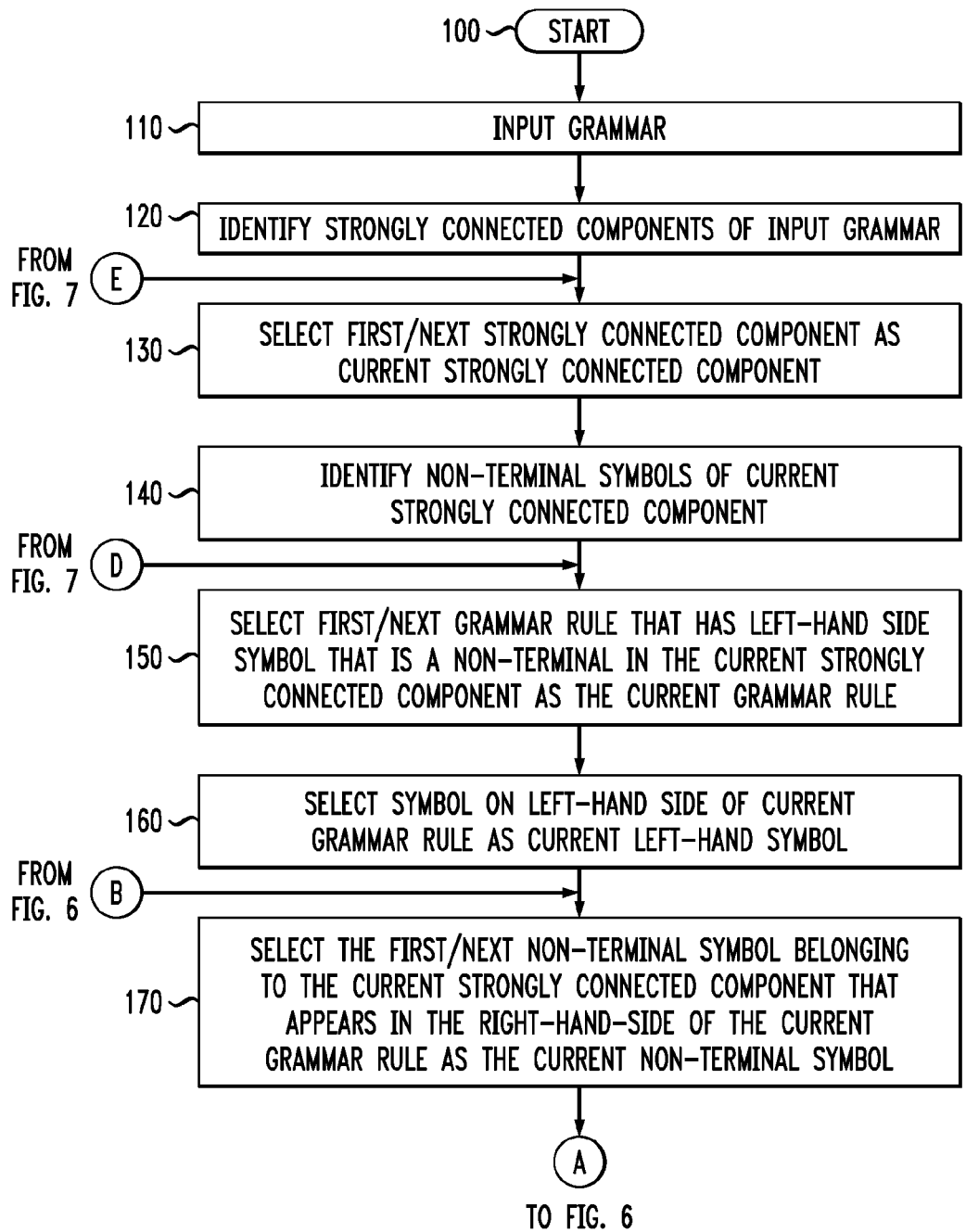
FIGS. 5-7 are a flowchart outlining one exemplary embodiment of a method for transforming irregular grammar rules into strongly regular grammar rules according to this invention.

A grammar is a set of rules that specify the set of acceptable sequences of symbols of a language. Additionally, grammars, such as context-free grammars, may assign parsing information to each acceptable sequence of symbols based on the non-terminal symbols of the grammar. A weighted grammar is one that additionally assigns some weight to each acceptable sequence of symbols. A weighted grammar is one which has costs or weights assigned to each rule. This allows the system implementing the grammar to have multiple rules with different outputs for the same input. Thus, in weighted grammars, each sequence of symbols is assigned a different probability. Subsequent rules can modify these probabilities.

The symbols in the grammar, for the purpose of this invention, are assigned specific definitions. Symbols that appear only on the right-hand side of a rule are the "terminal" symbols. The other symbols in the grammar that appear on the left-hand side of a rule, and possibly on the right-hand side of a rule as well, are the "non-terminal" symbols. If, for any rule, all non-terminal symbols in the right-hand side of that rule occur only after all terminal symbols of that rule, then that rule is a "right-linear" rule. A rule where all non-terminal symbols in the right-hand side of that rule occur before any terminal symbols occur in the right-hand side of that rule is a "left-linear" rule. A rule which has only terminal symbols or only non-terminal symbols on the right-hand side of that rule can be either a right-linear rule or a left-linear rule. If none of these cases occurs, the rule is neither right-linear nor left-linear.

A subset of the rules in a grammar form a "strongly connected component" if the non-terminal symbols in the subset appear on the left-hand side of one or more rules of the subset and the right-hand side of one or more other rules of the subset, such that those rules form a mutually inter-dependent subset of the rules of that grammar. For example, in one rule of a grammar, the non-terminal symbol X appears on the left-hand side of that rule, while the non-terminal symbol Y appears on the right-hand side of that rule. At the same time, in another rule of the grammar, the non-terminal symbol Y appears on the left-hand side of that rule, while the non-terminal symbol X appears on the right-hand side of that rule. Accordingly, these rules form a strongly connected component and the non-terminal symbols X and Y are the non-terminal symbols of strongly connected component.

Strongly regular grammars are grammars in which the rules of a given strongly connected component are either all right-linear or all left-linear. Efficient algorithms exist that generate a finite-state automaton accepting the language generated by a strongly regular grammar. Various exemplary embodiments of such efficient algorithms are disclosed in U.S. Patent Application Ser. No. 60/344,792, which is incorporated herein by reference in its entirety. The systems and methods according to this invention transform the rules of an input grammar, that may or may not already be strongly regular, into a second grammar that at least approximates the input grammar, where the second grammar has rules such that all the rules of each strongly connected component are either all right-linear or all left-linear. That is, the second grammar is strongly regular.

FIG. 1 illustrates one exemplary embodiment of a generalized grammar rule R of a grammar G. In particular, the generalized grammar rule R shown in FIG. 1 is neither right-linear nor left-linear. The generalized grammar rule R shown in FIG. 1 has a left-hand-side non-terminal symbol A, right-hand-side non-terminal symbols $B_i$, and right-hand-side, non-empty, terminal symbols $\alpha_i$. If the grammar G, for which the generalized grammar rule R is shown in FIG. 1, is weighted, the generalized grammar rule R is also assigned a cost X. There are several reasons why the generalized grammar rule R shown in FIG. 1 is not regular right-linear nor left-linear. First, there is more than one non-terminal symbol on the right-hand side if the value of the index variable m is greater than 1, i.e., if m>1. Second, non-empty terminal symbols appear both before and after the non-terminal symbols on the right-hand side. Thus, the generalized grammar rule R is neither right-linear nor left-linear. Accordingly, any strongly connected component containing the generalized grammar rule R will not be right-linear or left-linear.

FIG. 2 illustrates one exemplary embodiment of a generalized set of strongly regular grammar rules $R_s$. The generalized grammar rule R shown in FIG. 1 can be transformed into the generalized set of strongly regular grammar rules $R_s$ shown in FIG. 2 using the systems or methods according to this invention. The grammar G' (not shown) formed by the new generalized sets of strongly regular grammar rules $R_s$ is an approximation of the original grammar G (not shown) that was not strongly regular.

To generate the new generalized set of strongly regular grammar rules $R_s$, an approximation of each non-terminal symbol B, in the right side of the input generalized grammar rule R, is created to form the left-hand non-terminal symbol of each new strongly regular rule $R_{si}$. One exception is the first rule, in which the original left-hand non-terminal symbol from the input generalized grammar rule R is used as the left-hand non-terminal symbol of the new rule. A second exception is the last rule, in which an approximation of the left-hand non-terminal symbol of the input generalized grammar rule shown in FIG. 1 is used as the left-hand non-terminal symbol of the new rule.

To construct the right-hand symbols of each new strongly regular rule $R_{si}$ of the generalized set of strongly regular grammar rules $R_s$, zero, one or more terminal symbols and exactly one non-terminal symbol in the input generalized grammar rule, which either begin the right-hand side of the generalized grammar Rule R or immediately follow the non-terminal symbol on which the left-hand-side symbol of the new rule $R_{si}$ is based, are selected. One exception when assigning the right-hand symbols is the second to last rule, for which there is no right-hand non-terminal left in the original rule. In this case, in the second to last rule of the generalized set of strongly regular grammar rules $R_s$, an approximation of the original left-hand non-terminal symbol from the input generalized grammar rule R is used as the right-hand non-terminal symbol. A second exception when assigning the right-hand symbols is the last rule. The empty string ($\epsilon$) set is assigned as the right-hand symbol of the last rule.

If the input generalized grammar rule R shown in FIG. 1 has a cost X assigned to it, this cost X is distributed, in any desired manner, to all but the last new rule of the generalized set of strongly regular grammar rules $R_{si}$ shown in FIG. 2. It should be appreciated that, according to this invention, any criteria can be used to distribute the cost to all but the last new rule of the generalized set of strongly regular grammar rules $R_{si}$ shown in FIG. 2. The final rule shown in the set of new strongly regular grammar rules $R_{si}$ shown in FIG. 2 is assigned the identity value of the multiplicative operator of the semiring over which the cost X is defined.

The only constraint on how the cost is distributed is that the distributed costs, when recombined using the multiplicative operator of the semiring over which the cost X is defined, must equal the original cost X. For example, if the multiplicative operator is the addition operator, as in the tropical semiring, the costs assigned to the new rules $R_{si}$ of the generalized set of strongly regular grammar rules $R_s$ shown in FIG. 2, added together, must equal the cost assigned to the input generalized grammar rule R shown in FIG. 1. If the multiplicative operator is the multiplication operator, the costs assigned to the new rules $R_{si}$ of the generalized set of strongly regular grammar rules $R_s$ shown in FIG. 2, multiplied by each other, must equal the cost assigned to the input generalized grammar rule R shown in FIG. 1. Because the final rule of the generalized set of strongly regular grammar rules, shown in FIG. 2 is assigned the identity value of the multiplicative operator of the semiring over which the costs are defined, such as zero for the addition operator or 1 for the multiplication operator, the cost value assigned to the last new rule does not affect the recombined cost value.

FIG. 3 illustrates one exemplary embodiment of a grammar rule R' that is not regular. The grammar rule R' shown in FIG. 3 is a specific example of the generalized grammar rule R shown in FIG. 1. The grammar rule R' has non-terminal symbols T, X, Y and Z, terminal symbols a, b, c and d, and is assigned a cost or weight of 4.

FIG. 4 illustrates one exemplary embodiment of a set of strongly regular grammar rules $R'_s$. The grammar rule R' shown in FIG. 3 is transformed into the set of strongly regular grammar rules $R'_s$ shown in FIG. 4 using any one of various exemplary embodiments of the systems or methods according to this invention. The grammar $G'_s$ formed by the new generalized set of strongly regular rules $R'_s$ is an approximation of the original grammar G' that contains the grammar rule R' shown in FIG. 3.

To generate the new set of strongly regular grammar rules $R'_s$ shown in FIG. 4, approximate non-terminal symbols X', Y', Z' and T' are created from the original non-terminal symbols X, Y, Z and T of the original grammar rule R' shown in FIG. 3, to form the left-hand non-terminal symbol of each new rule $R'_{si}$ of the set of strongly regular grammar rules $R'_s$. The original left-hand non-terminal symbol T from the grammar rule R' shown in FIG. 3 is used as the left-hand symbol of the first new rule $R_{s1}$.

To construct the set of right-hand-side symbols of each new rule $R'_{si}$ of the set of strongly regular grammar rules $R'_s$ shown in FIG. 4, the terminal symbols and the non-terminal symbol in the input grammar rule R' shown in FIG. 3, which either begin the right-hand side of the generalized grammar Rule R or immediately follow the non-terminal symbol on which the left-hand side of the new rule $R'_{s1}$ is based, are selected. For the first new rule $R'_{s1}$, the left-hand symbol T is used and the symbols aX are selected. Then, for the second new rule, $R'_{s2}$, the approximate non-terminal X' is used as the left-hand-side symbol, because the non-terminal symbol X is used on the right-hand side of the first new rule $R'_{s1}$. For this second new rule $R'_{s2}$, the next zero, one or more terminal symbols and the next non-terminal symbol, in this case, the symbols bcY, are selected as the set of right-hand-side symbols. Next, for a third new rule $R'_{s3}$, the approximate non-terminal Y' is used as the left-hand-side symbol, because the non-terminal symbol Y is used on the right-hand side of the second new rule $R'_{s2}$. For this third new rule $R'_{s3}$, the next zero, one or more terminal symbols and the next non-terminal symbol, in this case, the symbol Z, are selected as the set of right-hand-side symbols.

For the second to last new rule $R'_{s4}$, the approximate non-terminal Z' is used as the left-hand-side symbol, because the non-terminal symbol Z is used on the right-hand side of the third new rule $R'_{s3}$. For the second to last rule $R'_{s4}$, the last terminal symbol d and the approximate new non-terminal symbol T' obtained from the original left-hand non-terminal symbol T of the input grammar rule R' shown in FIG. 3 are used as the right-hand symbols, as shown in FIG. 4. For the last new rule $R'_{s5}$, the new non-terminal symbol T' that was obtained from the original left-hand-side non-terminal symbol is used as the left-hand-side symbol. The empty string or symbol (ε) is used as the right-hand-side non-terminal symbol in the last new rule $R'_{s5}$ of the $R'_{s5}$ generalized set of strongly regular grammar rules $R'_s$ shown in FIG. 4.

In the grammar rule R' shown in FIG. 3, the cost of this grammar rule R' is, for example, defined over the tropical semiring, which uses the addition operator as the multiplicative operator. Thus, in the new set of strongly regular grammar rules $R'_s$ shown in FIG. 4, the cost of this grammar rule R', 4, is distributed so that the sum of the distributed costs of the new rules $R'_s$ also equals 4. One exemplary method is to distribute the original cost evenly between all but the last new rule, as shown in FIG. 4. The last rule is assigned a cost of 0, the identity value of the addition operator, which is the multiplicative operator of the tropical semiring.

Figure 6:
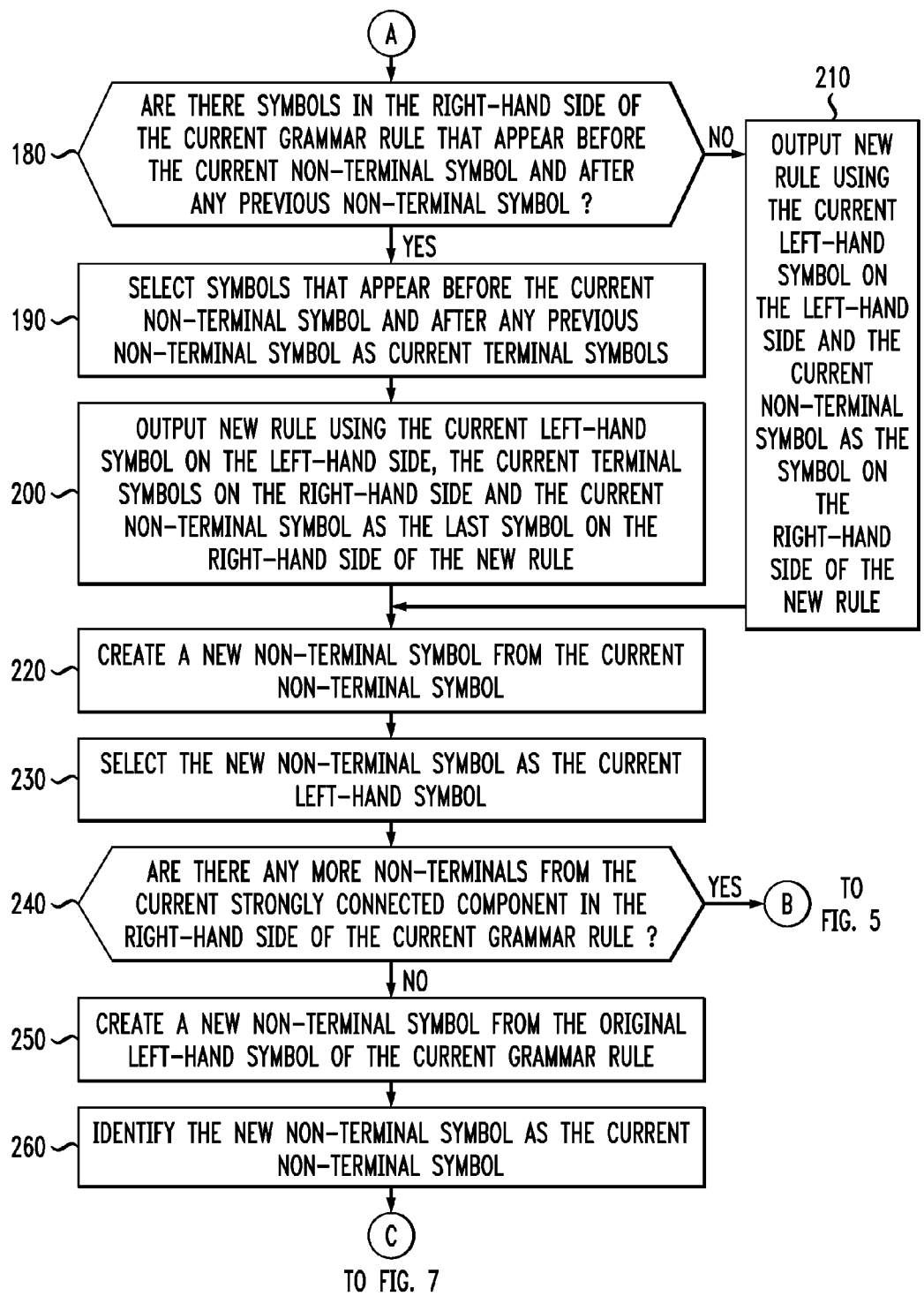
Figure 7:
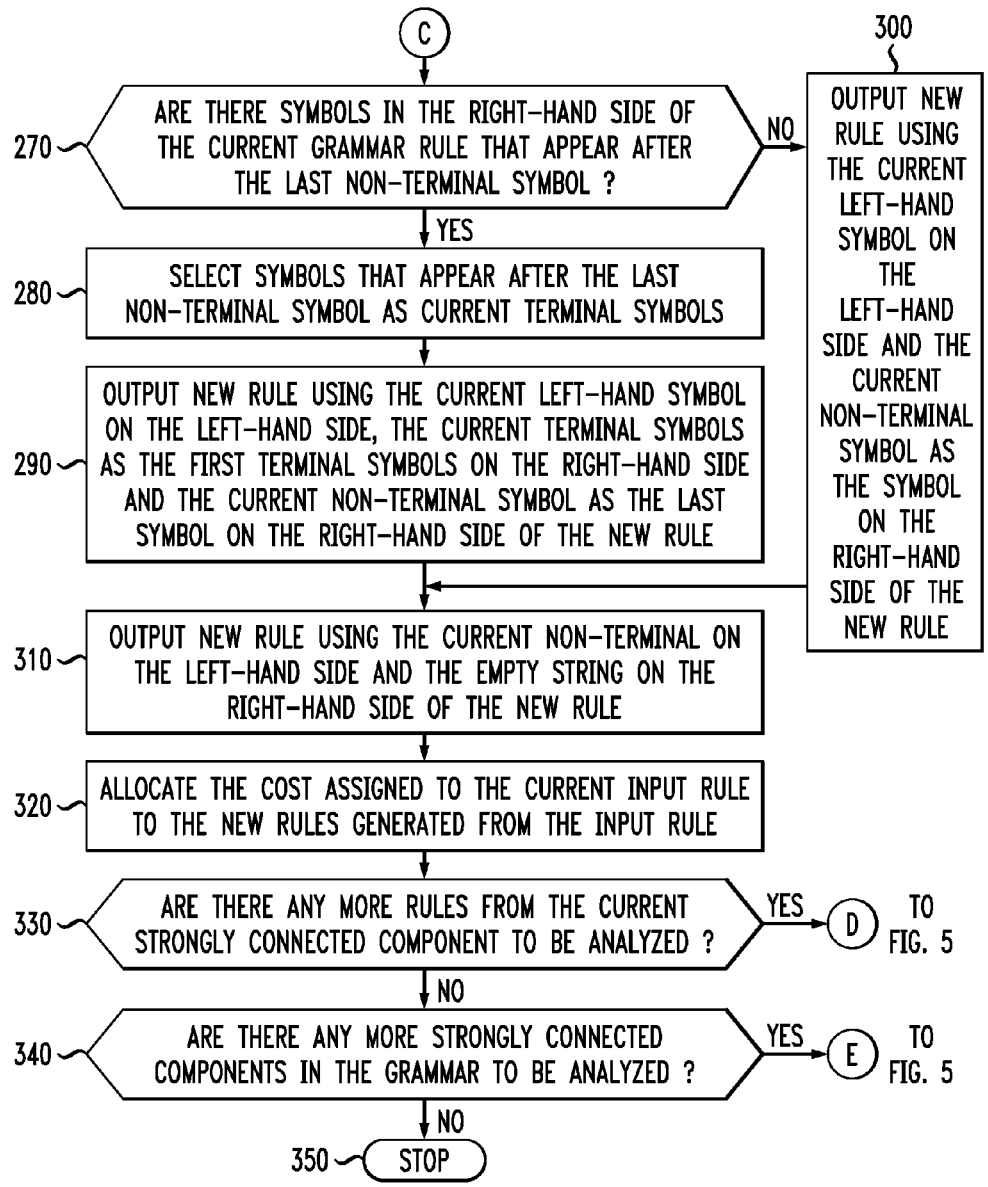

FIGS. 5-7 are a flowchart outlining one exemplary embodiment of a method for transforming irregular grammar rules into strongly regular grammar rules according to this invention. As shown in FIG. 5-7, operation of the method begins in step 100 and continues to step 110, where a grammar G, comprising a plurality of rules R, is input. Then, in step 120, the strongly connected components S of the grammar G input in step 110 are determined. The incorporated patent application 60/344,792 discloses one exemplary embodiment of a method for determining strongly connected components from an input grammar. Operation then continues to step 130.

In step 130, the first or next one of the identified strongly connected components S of the input grammar G is selected as the current strongly connected component. Next, in step 140, the non-terminal symbols that belong to the current strongly connected component are identified as the non-terminal symbols for the current strongly connected component $S_i$. In particular, any non-terminal symbols of the input grammar G that do not appear in the current strongly connected component $S_i$ are treated as terminal symbols in the current strongly connected component $S_i$. Then, in step 150, the first or next grammar rule $R_i$ that belongs to the current strongly connected component $S_i$ is selected as the current grammar rule. Operation then continues to step 160.

In step 160, the non-terminal symbol on the left-hand side of the current grammar rule is selected as the current left-hand non-terminal symbol. Next, in step 170, the first or next non-terminal symbol belonging to the current strongly connected component that appears in the right-hand side of the current grammar rule is selected as the current non-terminal symbol. Then, in step 180, a determination is made whether there are terminal symbols for the current strongly connected component in the right-hand side of the current grammar rule that appear before the current non-terminal symbol and after any previously selected non-terminal symbols, if any. If not, operation jumps to step 210. Otherwise, operation continues to step 190.

In step 190, the terminal symbols for the current strongly connected component that appear in the right-hand side of the current grammar rule, before the current non-terminal symbol and after any previously selected non-terminal symbols, if any, are selected as the current terminal symbols. Next, in step 200, a new right-linear grammar rule is generated and output using the current left-hand symbol as the left-hand-side non-terminal symbol of the current new rule, the current terminal symbols as the first symbols on the right-hand side of the current new rule and the current non-terminal symbol as the non-terminal symbol on the right-hand side of the current new rule. Operation then jumps to step 220. In contrast, in step 210, a new right-linear grammar rule is generated and output, using the current left-hand symbol for the left-hand side of the current new rule and the current non-terminal symbol as the non-terminal symbol on the right-hand side of the current new rule. Operation then continues to step 220.

In step 220, a new non-terminal symbol is created based on the current non-terminal symbol. Next, in step 230, this new non-terminal symbol is selected as the current left-hand symbol. Then, in step 240, a determination is made whether any more non-terminals of the current strongly connected component appear on the right-hand side of the current grammar rule that have not yet been used to create a new rule. If so, operation returns to step 170. Otherwise, operation continues to step 250.

In step 250, a new non-terminal symbol is created from the original left-hand symbol of the current grammar rule. Next, in step 260, this new non-terminal symbol is selected as the current non-terminal symbol. Then, in step 270, a determination is made whether any non-terminal symbols on the right-hand side of the current grammar rule appear after the previously-selected non-terminal symbol on the right-hand side of the current rule. If not, operation jumps to step 300. Otherwise operation continues to step 280.

In step 280, the terminal symbols that appear in the right-hand side of the current grammar rule after the previously-selected non-terminal symbol are selected as the current terminal symbols. Next, in step 290, a new right-linear grammar rule is generated and output, using the current left-hand symbol as the left-hand-side non-terminal symbol, the current terminal symbols as the terminal symbols on the right-hand side and the current non-terminal symbol as the last non-terminal symbol on the right-hand side. Operation then jumps to step 310. In contrast, in step 300, a new right-linear grammar rule is generated and output, using the current left-hand symbol as the left-hand-side non-terminal symbol and the current non-terminal symbol as the only symbol on the right-hand side. Operation then continues to step 310.

In step 310, a new grammar rule is generated and output using the current non-terminal symbol as the left-hand-side non-terminal symbol and the empty set as the right-hand side. Next, in step 320, the cost of the current grammar rule is distributed to all of the new rules generated from it. It should be appreciated that any method consistent with the approach to assigning costs to the input grammar of step 110 may be used. Using the identity value of the multiplicative operator of the semiring over which the original cost was defined in the grammar input in step 110, the combined costs of all of the new rules derived from the current rule, when recombined, should equal the cost assigned to the current rule. Next, in step 330, a determination is made whether there are any more rules $R'_i$ of the current strongly connected component $S_i$ to be transformed. If so, operation returns to step 150. Otherwise, operation continues to step 340. In step 340, a determination is made whether there are any more strongly connected component $S_i$ to be analyzed. If so, operation returns to step 130. Otherwise, operation continues to step 350, where operation of the method ends.

It should be appreciated that, in various exemplary embodiments, grammar rules that are already right-linear need not be transformed. In this case, steps 150-320 can be omitted for input grammar rules that are already right-linear. The rules that are not transformed are then combined with the new right-linear approximate rules to form the approximate strongly regular grammar.

It should also be appreciated that, in various exemplary embodiments, grammar rules belonging to strongly connected components that are already strongly regular need not be transformed. In this case, steps 130-330 can be omitted for strongly connected components that are already strongly regular. The rules that are not transformed are then combined with the new right-linear approximate rules to form the approximate strongly regular grammar.

It should also be appreciated that, in various exemplary embodiments, grammar rules may be transformed without identifying the strongly connected components or their non-terminal symbols. In this case, steps 120, 130, 140 and 340 can be omitted for all rules, and steps 150, 170 and 330 are modified to operate on the input grammar instead of the current strongly connected component.

Thus, it should be appreciated that, in step 130, any strongly connected components that have rules that are already all left-linear or all right-linear may be skipped and used in the output grammar in their original form. In various exemplary embodiments, in step 130, only strongly connected components S that are not strongly regular are selected. Also, it should be appreciated that, in step 150, rules R' that are already right-linear or either right- or left-linear can be skipped and used in the output grammar in their original form.

Figure 8:
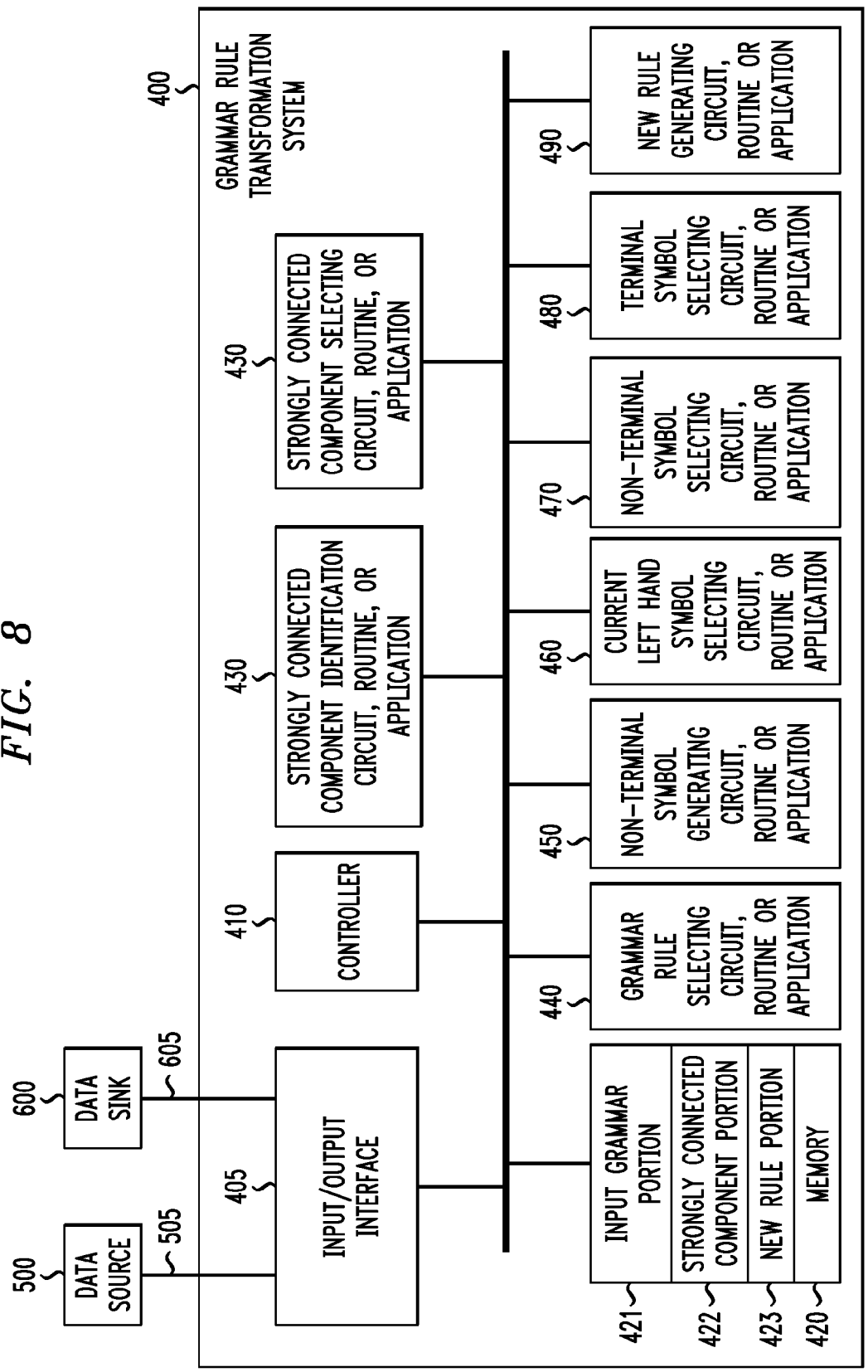
FIG. 8 is a block diagram of one exemplary embodiment of a grammar rule transformation device according to this invention.

FIG. 8 shows one exemplary embodiment of a grammar rule transformation system 400 that generates strongly regular grammars according to this invention. As shown in FIG. 8, the grammar rule transformation system 400 includes an input/output interface 405, a controller 410, a memory 420, a strongly connected component identifying circuit, routine or application 430, a strongly connected component selecting circuit, routine or application 435, a grammar rule selecting circuit, routine or application 440, a non-terminal symbol generating circuit, routine or application 450, a current left-hand symbol selecting circuit, routine or application 460, a non-terminal symbol selecting circuit, routine or application 470, a terminal symbol selecting circuit, routine or application 480, and a new rule generating circuit, routine or application 490, interconnected by one or more control and/or data busses and/or application programming interfaces 415.

As shown in FIG. 8, a grammar data source 500 and a grammar data sink 600 are connected to the grammar rule transformation system 400 by the links 505 and 605, respectively. In general, the grammar data source 500 and the grammar data sink 600 shown in FIG. 8 can each be any one of a number of different devices, such as a general-purpose computer having a processor, or a device suitable for storing and/or transmitting grammar data, such as a client or server of a network or the Internet having a processor, and the World Wide Web. For example, the grammar data source 500 or the grammar data sink 600 may be a data carrier, such as a magnetic storage disk, CD-ROM or the like, or a host computer, that contains grammar data.

In general, each of the grammar data source 500 and the grammar data sink 600 can be implemented using any known or later-developed device that is capable of providing grammar data to, or receiving data from, the grammar rule transformation system 400. It should be appreciated that the grammar data source 500 and the grammar data sink 600 do not need to be the same type of device. Each of the grammar data source 500 and the grammar data sink 600 can be integrated with the grammar rule transformation system 400, such as in a general-purpose computer with internal memory. In addition, the grammar rule transformation system 400 may be integrated with devices providing additional functions, in addition to the grammar data source 500 and/or the grammar data sink 600, as in a larger system using grammars to process data, such as a speech recognition system.

Each of the links 505 and 605 respectively connecting the grammar data source 500 and the grammar data sink 600 to the grammar rule transformation system 400 can be a connection device, such as a direct cable connection, a modem, a local area network, a wide area network, a storage area network, an intranet, an extranet, the Internet, any other distributed processing network, or any other known or later-developed connection device. It should be appreciated that any of these connections may be wired or wireless. In general, each of the links 505 and 605 can be implemented using any known or later-developed connection system or structure usable to connect the respective devices to the grammar rule transformation system 400. It should be understood that the links 505 and 605 do not need to be of the same type.

As shown in FIG. 8, the memory 420 can be implemented using any appropriate combination of alterable, volatile, or non-volatile memory or non-alterable, or fixed, memory. The alterable memory, whether volatile or non-volatile, can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-0ROM disk and disk drive or the like.

In various exemplary embodiments, the grammar transformation system 400 is implemented as software executing on a programmed general purpose computer, a special purpose computer, a microprocessor or the like. Alternatively, in various exemplary embodiments, the grammar rule transformation system 400 can be implemented as a routine embedded in a library, or a resource residing on a server, or the like. In various exemplary embodiments, the grammar rule transformation system 400 can also be implemented by physically incorporating the grammar rule transformation system 400 into a software and/or hardware system, such as a speech recognition system or language translation system of a computer or communication device. It should be understood that each of the various embodiments of the grammar rule transformation system 400 do not need to be implemented the same way.

It should also be understood that each of the circuits, routines, objects, applications or managers 405-490 shown in FIG. 8 can be implemented as portions of a suitably programmed general-purpose computer. Alternatively, each of the circuits, routines, objects, applications or managers 405-490 shown in FIG. 8 can be implemented as physically distinct hardware circuits within an ASIC, using a digital signal processor (DSP), using a FPGA, a PDL, a PLA and/or a PAL, or using discrete logic elements or discrete circuit elements. The particular form that the circuits, routines, objects, applications or managers 405-490 shown in FIG. 8 will take is a design choice and will be obvious and predictable to those skilled in the art. It should be appreciated that the circuits, routines, objects, applications or managers 405-490 shown in FIG. 8 do not need to be of the same design.

When operating the grammar rule transformation system 400, the input grammar rules representing a non-regular grammar, in the format shown in FIG. 1, are input from the grammar data source device 500 over the link 505. The input/output interface 405 inputs the received grammar rules, and, under the control of the controller 410, forwards the received grammar rules to an input grammar portion 421 of the memory 420 or to the strongly connected component identification circuit, routine or application 430.

Under the controller 410, the strongly connected component identification circuit, routine or application 430 then retrieves the input grammar rules from the input grammar portion 421 or receives the input grammar rules directly from the input/output interface 405. The strongly connected component identification circuit, routine or application 430 identifies the various groups of the non-terminal symbols that make up the strongly connected components S of the input grammar. It should be appreciated that any one or more known or later-developed methods for identifying strongly connected components in grammar rules can be used. One exemplary embodiment of a method for determining strongly connected components from a set of grammar rules is disclosed in the incorporated patent application 60/344,792. The strongly connected component identification circuit, routine or application 430 then, under control of the controller 410, either stores the identified non-terminal symbols that make up each strongly connected component in a strongly connected component portion 422 of the memory 420 or outputs them directly to the strongly connected component selecting circuit, routine or application 435.

The strongly connected component selecting circuit, routine or application 435 selects a strongly connected component as a current strongly connected component and retrieves the non-terminal symbols of the current strongly connected component from the strongly connected component portion 422 and forwards the retrieved non-terminal symbols to at least the grammar rule selecting circuit or application 440. Once the grammar rule selecting circuit or application 440 has selected all of the rules that use one of the retrieved non-terminal symbols as a left-hand-side non-terminal symbol, the strongly connected component selecting circuit or application 435 selects another strongly connected component. If there are no more strongly connected components that have not been selected, the input/output interface 405 receives the new grammar rules from the new rule portion 423 under the control of the controller 410. Then, under control of the controller 410, the input/output interface 405 outputs the new grammar rules, in the format shown in FIG. 2, to the grammar data sink device 600 over the link 605.

The grammar rule selecting circuit, routine or application 440 selects an input grammar rule, such as that shown in FIG. 1 or FIG. 3, which has a left-hand symbol that is a non-terminal symbol of the current strongly connected component. The selected grammar rule is retrieved from the input grammar rule portion 421 of the memory 420 under control of the controller 410. When all of the new rules $R'_{si}$ to be generated by the new rule generating circuit, routine or application 490 have been generated from the selected input rule $R'_i$, a new input grammar rule $R'_{i+1}$, that has a left-hand-side non-terminal symbol that is also a non-terminal symbol of the current strongly connected component, is selected and retrieved by the input grammar rule selecting circuit, routine, or application 440. Once all of the input grammar rules which have a left-hand symbol that is also a non-terminal symbol in the current strongly connected component have been selected and converted, the current strongly connected component selecting circuit, routine or application 435 selects a new strongly connected component.

The non-terminal symbol generation circuit, routine or application 450 generates the new non-terminal symbols $B'_i$ of the grammar, which only approximate the original non-terminal symbols $B_i$, from the symbols in the selected input grammar, such as that shown in FIG. 1. The current left-hand symbol selecting circuit, routine or application 460, the non-terminal symbol selecting circuit, routine or application 470, and the terminal symbol selecting circuit, routine or application 480 operate together to generate a set of new symbols $B_{i-1}'$, $\alpha_{i-1}$ and $B_i$ from the original symbols in the selected input grammar rule and the new non-terminal symbols.

In particular, the current left-hand symbol selecting circuit routine or application 460 selects the left-hand symbol $B_{i-1}'$ for the current new rule $R'_{si}$, from the new non-terminals generated by the non-terminal symbol generating circuit, routine or application 450. The non-terminal symbol selecting circuit, routine or application 470 selects the right-hand non-terminal symbol $B_i$ for the current new rule $R'_{si}$, from the non-terminals of the selected input grammar rule. The terminal symbol selecting circuit, routine or application 480 selects the terminal symbols for the right-hand side of the current new rule R'$_{si}$ from the terminal symbols of the selected input grammar rule.

The new rule generating circuit or application 490 generates a new rule R'$_{si}$, such as those shown in FIG. 2, from the symbols selected by the circuits, routines or applications 460-480. The new rule is stored, under the control of the controller 410, in the new rule portion 423 of the memory 420. Once a new rule has been stored, the circuits or applications 460-480 select a new set of current symbols. If there are no more symbols to be selected in the selected input grammar rule, the grammar rule selecting circuit, routine or application 440 selects the next input grammar rule.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for generating a set of strongly regular grammar rules from a first grammar rule, the first grammar rule having a plurality of non-terminal symbols and at least one terminal symbol, the method comprising:
    creating via a processor a first rule of a set of strongly regular grammar rules used in speech recognition using a current left-hand-side symbol from a first grammar rule on a left-hand side of a first rule, any identified terminal symbols from that first grammar rule as initial symbols on the right-hand side of the first rule, and a current right-hand-side non-terminal symbol from the first grammar rule as a last symbol on a right-hand side of the first rule; and
    if the first grammar rule has a weight, equally distributing the weight of the first grammar rule to each of the rules in a portion of the set of strongly regular grammar rules.

2. The method of claim 1, wherein the distribution of the weight, when recombined using a multiplicative operator over a semiring over which the weights are defined, equals the original weight of the first grammar rule.

3. The method of claim 1, wherein if the multiplicative operator is an addition operator, the distributed weights must add together in the recombination to equal the weight of the first grammar rule.

4. The method of claim 1, further comprising:
    creating a new non-terminal symbol for the strongly regular grammar from the current right-hand-side non-terminal symbol;
    selecting the new non-terminal symbol as the current left-hand-side symbol;
    identifying a left-most non-terminal symbol of the right-hand side of the first grammar rule that is to the right of the current right-hand-side non-terminal symbol;
    identifying any terminal symbols of the right-hand side of the first grammar rule located between the current right-hand-side non-terminal symbol and the identified left-most non-terminal symbol;
    selecting the identified left-most non-terminal symbol as the current right-hand-side non-terminal symbol; and
    creating a next rule of the set of strongly regular grammar rules using the current left-hand-side symbol on the left-hand side of the next rule, any identified terminal symbols as the initial symbols on the right-hand side of the next rule, and the current right-hand-side non-terminal symbol as the last symbol on the right-hand side of the next rule.

5. The method of claim 4, further comprising repeating the steps of claim 4 to create additional next rules until a last one of the non-terminal symbols of the first grammar rule has been used.

6. The method of claim 5, further comprising:
    creating a new non-terminal symbol for the strongly regular grammar from the current right-hand-side non-terminal symbol;
    selecting the new non-terminal symbol as the current left-hand-side symbol;
    creating a second new non-terminal symbol for the strongly regular grammar from the left-hand-side non-terminal symbol of the first grammar rule;
    identifying any terminal symbols of the right-hand side of the first grammar rule located to the right of the current right-hand-side non-terminal symbol; and
    creating another next rule of the set of strongly regular grammar rules using the current left-hand-side symbol on the left-hand side of the another next rule, any identified terminal symbols as the initial symbols on the right-hand side of the another next rule, and the second new non-terminal symbol as the last symbol on the right-hand side of the another next rule.

7. The method of claim 6, further comprising:
    selecting the second new non-terminal symbol as the current left-hand-side symbol; and
    creating a last new rule of the set of strongly regular grammar rules using the current left-hand-side symbol on the left-hand side of the next rule and the empty symbol on the right-hand side of the last new rule.

8. The method of claim 7, wherein distributing the weight of the first grammar rule to a portion of the rules of the set of strongly regular grammar rules comprises:
    assigning an identity value of a multiplicative operator of a semiring over which the weight of the first grammar rule is defined as the weight of the last new rule.

9. The method of claim 8, wherein distributing the weight of the first grammar rule to the portion of the set of strongly regular grammar rules except the last new rule comprises equally distributing the weight of the first grammar rule to each rule of the portion of the set of rules.

10. A computing device for generating a set of strongly regular grammar rules from a first grammar rule, the first grammar rule having a plurality of non-terminal symbols and at least one terminal symbol, the computing device comprising:
    a processor;
    a module configured to control the processor to create a first rule of a set of strongly regular grammar rules used in speech recognition using a current left-hand-side symbol from a first grammar rule on a left-hand side of a first rule, any identified terminal symbols from that first grammar rule as initial symbols on a right-hand side of the first rule, and a current right-hand-side non-terminal symbol from the first grammar rule as a last symbol on a fight-hand side of the first rule, and
    a module configured, if the first grammar rule has a weight, to control the processor to equally distribute the weight of the first grammar rule to each of the rules in a portion of the set of strongly regular grammar rules.

11. The computing device of claim 10, wherein the distribution of the weight, when recombined using a multiplicative operator over a semiring over which the weights are defined, equals the original weight of the first grammar rule.

12. The computing device of claim 10, wherein if the multiplicative operator is an addition operator, the distributed weights must add together in the recombination to equal the weight of the first grammar rule.

13. The computing device of claim 10, further comprising:
a module configured to control the processor to create a new non-terminal symbol for the strongly regular grammar from the current right-hand-side non-terminal symbol;
a module configured to control the processor to select the new non-terminal symbol as the current left-hand-side symbol;
a module configured to control the processor to identify a left-most non-terminal symbol of the right-hand side of the first grammar rule that is to the right of the current right-hand-side non-terminal symbol;
a module configured to control the processor to identify any terminal symbols of the right-hand side of the first grammar rule located between the current right-hand-side non-terminal symbol and the identified left-most non-terminal symbol;
a module configured to control the processor to select the identified left-most non-terminal symbol as the current right-hand-side non-terminal symbol; and
a module configured to control the processor to create a next rule of the set of strongly regular grammar rules using the current left-hand-side symbol on the left-hand side of the next rule, any identified terminal symbols as the initial symbols on the right-hand side of the next rule, and the current right-hand-side non-terminal symbol as the last symbol on the right-hand side of the next rule.

14. The computing device of claim 13, further comprising a module configured to control the processor to repeat the functions preformed by the modules in claim 13 to create additional next rules until a last one of the non-terminal symbols of the first grammar rule has been used.

15. The computing device of claim 14, further comprising:
a module configured to control the processor to create a new non-terminal symbol for the strongly regular grammar from the current right-hand-side non-terminal symbol;
a module configured to control the processor to select the new non-terminal symbol as the current left-hand-side symbol;
a module configured to control the processor to create a second new non-terminal symbol for the strongly regular grammar from the left-hand-side non-terminal symbol of the first grammar rule;
a module configured to control the processor to identify any terminal symbols of the right-hand side of the first grammar rule located to the right of the current right-hand-side non-terminal symbol; and
a module configured to control the processor to create another next rule of the set of strongly regular grammar rules using the current left-hand-side symbol on the left-hand side of the another next rule, any identified terminal symbols as the initial symbols on the right-hand side of the another next rule, and the second new non-terminal symbol as the last symbol on the right-hand side of the another next rule.

16. The computing device of claim 15, further comprising:
a module configured to control the processor to select the second new non-terminal symbol as the current left-hand-side symbol; and
a module configured to control the processor to create a last new rule of the set of strongly regular grammar rules using the current left-hand-side symbol on the left-hand side of the next rule and the empty symbol on the right-hand side of the last new rule.

17. The computing device of claim 16, wherein the module configured to control the processor to distribute the weight of the first grammar rule to a portion of the rules of the set of strongly regular grammar rules further:
assigns an identity value of a multiplicative operator of a semiring over which the weight of the first grammar rule is defined as the weight of the last new rule.

18. The computing device of claim 17, wherein the module configured to control the processor to distribute the weight of the first grammar rule to the portion of the set of strongly regular grammar rules except the last new rule further equally distributes the weight of the first grammar rule to each rule of the portion of the set of rules.

19. A computer readable storage medium storing instructions for controlling a computing device to generate a set of strongly regular grammar rules from a first grammar rule, the first grammar rule having a plurality of non-terminal symbols and at least one terminal symbol, the instructions comprising:
controlling a processor to create a first rule of a set of strongly regular grammar rules used in speech recognition using a current left-hand-side symbol from a first grammar rule on a left-hand side of a first rule, any identified terminal symbols from that first grammar rule as initial symbols on a right-hand side of the first rule, and a current right-hand-side non-terminal symbol from the first grammar rule as a last symbol on a right-hand side of the first rule; and
if the first grammar rule has a weight, controlling the processor to equally distribute the weight of the first grammar rule to each of the rules in a portion of the set of strongly regular grammar rules.

* * * * *